March 18, 1952      M. J. STEFFES      2,589,451
METHOD OF FORMING CIRCULAR CUTTERS
Filed Jan. 24, 1947
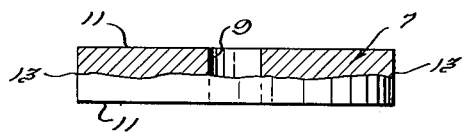
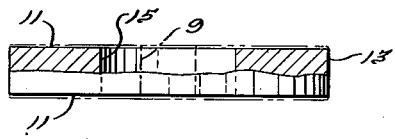
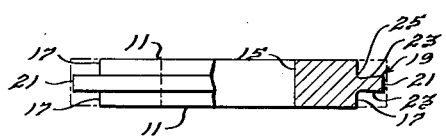
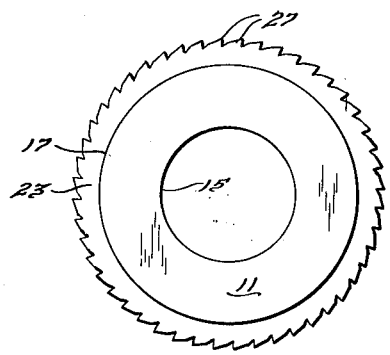
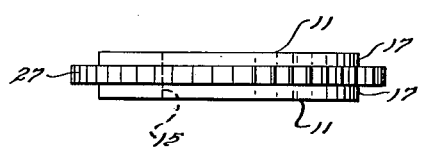
INVENTOR.
*Milton J. Steffes.*
BY
*Harness, Dickey & Pierce*
ATTORNEYS.

Patented Mar. 18, 1952

2,589,451

UNITED STATES PATENT OFFICE 2,589,451

METHOD OF FORMING CIRCULAR CUTTERS

Milton J. Steffes, Dearborn, Mich., assignor to Super Tool Company, Detroit, Mich., a corporation of Michigan Application January 24, 1947, Serial No. 724,148

3 Claims. (Cl. 51—288)

This invention relates to an improved method of forming a circular cutter.

The principal objects of this invention are to provide a method for forming circular cutters of various sizes from a hardened metal blank; and to provide an improved method for forming a circular cutter from a blank of exceptionally hard material whereby the manufacture of said cutter will be relatively inexpensive.

These and other objects of this invention will become more apparent from the following detailed description taken in conjunction with the accompanying drawings in which:

Figure 1 is a view, partially in section and partially in elevation, of a blank from which the finished circular cutter is formed;

Figure 2 is a view, partially in section and partially in elevation, of the structure illustrated in Fig. 1 with the opposite flat sides and the central opening therein dressed as desired for the finished cutter;

Fig. 3 is a view, partially in section and partially in elevation, of the structure illustrated in Fig. 2 with the shoulders formed on the outer periphery thereof so as to define the central flange;

Fig. 4 is a side elevational view of the structure illustrated in Fig. 3 with the cutting teeth formed on the central flange;

Fig. 5 is a plan view of the structure illustrated in Fig. 4.

As seen in Fig. 1, a molded blank 7, made of hard material such as tungsten carbide, Stellite or the like, is provided, from which the finished cutter is to be made. The blank 7 is formed with a central opening 9 therethrough, and is of a washer shape with opposite flat sides 11 and a circular outer periphery 13.

The first step in forming the finished circular cutter is to dress the opposite flat sides 11 of the blank so that they are substantially flat and in a parallel relationship. This is accomplished by lapping the surfaces with a diamond impregnated tool. The distance between the flat surfaces 11 can likewise be varied, if desired, during this operation to obtain the desired width for the cutter. The central opening 9 of the blank 7 is similarly lapped to a desired size, as illustrated in Fig. 2. Thus the inside diameter 15 of the blank can be varied according to the various cutter needs.

As illustrated in Fig. 3, the next step in forming the cutter is to lap the outer periphery 13 of the blank 7 so as to form a pair of oppositely disposed shoulders 17 thereon which in turn define a central flange 19 extending therearound. Each side of the flange 19, rearwardly of its outer periphery 21, is dished back as at 23, to provide relief therefore. The inner ends of the dished out sides 23 join the shoulders 17 through a substantial radius 25.

The outer periphery 21 of the flange 19 is then lapped to the desired diameter and a plurality of circumferentially spaced cutting teeth 27 are then cut on the outer periphery 21 of the flange.

In this way, it will be seen that a finished circular cutter, as illustrated in Figs. 4 and 5, is formed from the blank 7 in a relatively simple manner and the outside and inside diameter of the cutter can be varied so that various sized cutters may be formed from one blank.

By dishing out the flange 19 rearwardly of the cutting teeth 27, relief is provided therefore so as to eliminate binding or heating up of the cutting teeth 27, and by connecting the flange 19 to the shoulders 17 through a substantial radius 25 the danger of the flange 19 breaking is greatly reduced.

It will therefore appear that an improved circular cutter, made of extremely hard material is provided which may be used, for example, to cut high mica between commutator bars on armatures, and which may be varied in size according to the construction of the armature on which it is to operate.

What is claimed is:

1. The method of forming a circular cutter from a hard metal blank of a generally washer shape comprising the steps of dressing the opposite flat sides of said blank in a flat parallel relation to provide a desired dimension therebetween, of lapping the central opening of said blank to a desired diameter; of lapping opposite sides of the outer periphery of said blank to form shoulders which define a central hub having a circular flange extending outwardly thereon; and of forming circumferentially spaced cutting teeth on the outer periphery of the flange.

2. The method of forming a circular cutter from a hard metal blank of generally washer shape comprising the steps of dressing the opposite sides of said blank in a flat parallel relationship to provide a desired dimension therebetween; of lapping the central opening of said blank to produce a desired inside diameter for said cutter; of lapping opposite sides of the outer periphery of said blank to form shoulders which define a central hub having a circular flange extending outwardly thereon; of lapping the outer periphery of said flange to produce a desired outside diameter for said cutter which is concentric to the wall of said central opening; and of forming circumferentially spaced cutting teeth on the outer periphery of said flange.

3. The method of forming a circular cutter from a hard metal blank of a generally washer shape comprising the steps of dressing the opposite sides of said blank in a flat parallel relationship to provide a desired dimension therebetween; of lapping the central opening of said blank to produce a desired inside diameter for said cutter; of lapping opposite sides of the outer periphery of said blank to form shoulders which define a central hub having a circular flange extending outwardly thereon; of dishing out the opposite sides of said flange inwardly of the outer peripheral edge thereof to provide relief therefor; of lapping a substantial radius between the inner ends of said dished out flange sides and said cutter shoulders; of lapping the outer peripheral edge of said flange to produce a desired outside diameter for said cutter which is concentric to the wall of said central opening; and of forming circumferentially spaced cutting teeth on the outer periphery of said flange.

MILTON J. STEFFES.

REFERENCES CITED

The following references are of record in the file of this patent:

UNITED STATES PATENTS

| Number | Name | Date |
|---|---|---|
| 1,141,700 | Eberhardt | June 1, 1915 |
| 1,379,853 | Cogsdill | May 31, 1921 |
| 1,571,346 | Schramm | Feb. 2, 1926 |
| 1,752,507 | Ruthven | Apr. 1, 1930 |
| 1,931,684 | Aker | Oct. 24, 1933 |
| 1,989,667 | Covill | Feb. 5, 1935 |
| 2,314,533 | Wallace | Mar. 23, 1943 |
| 2,413,989 | Molner et al. | Jan. 7, 1947 |
| 2,422,404 | Goehle | June 17, 1947 |

OTHER REFERENCES

Machinery, "How Carboloy Tools are Made," June 1932, pages 727–730.

Machinery, "Tungsten-Carbide in the Westinghouse Plant," December 1930, pages 259–261.